United States Patent
Hulmani et al.

(10) Patent No.: US 9,398,319 B2
(45) Date of Patent: *Jul. 19, 2016

(54) SYSTEM, METHOD, AND APPARATUS FOR PLAYING BACK A PLURALITY OF VIDEO ELEMENTARY STREAMS WITH ONE PLAYBACK CHANNEL

(71) Applicant: Broadcom Corporation, Irvine, CA (US)

(72) Inventors: Girish Hulmani, Bangalore (IN); Arul Thangaraj, Bangalore (IN); Sandeep Bhatia, Bangalore (IN)

(73) Assignee: BROADCOM INCORPORATED, Irvine, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/279,873

(22) Filed: May 16, 2014

(65) Prior Publication Data
US 2014/0250483 A1   Sep. 4, 2014

Related U.S. Application Data

(63) Continuation of application No. 10/610,247, filed on Jun. 30, 2003, now Pat. No. 8,731,378.

(51) Int. Cl.
| | |
|---|---|
| *H04N 5/92* | (2006.01) |
| *H04N 5/935* | (2006.01) |
| *H04N 5/78* | (2006.01) |
| *H04N 5/917* | (2006.01) |
| *H04N 21/2365* | (2011.01) |
| *H04N 21/434* | (2011.01) |
| *H04N 19/70* | (2014.01) |
| *H04N 19/44* | (2014.01) |
| *H04N 5/84* | (2006.01) |
| *H04N 5/89* | (2006.01) |

(Continued)

(52) U.S. Cl.
CPC ........... *H04N 21/2365* (2013.01); *H04N 19/44* (2014.11); *H04N 19/70* (2014.11); *H04N 21/4347* (2013.01); *G11B 2020/10722* (2013.01)

(58) Field of Classification Search
CPC ........... H04N 5/92; H04N 5/935; H04N 5/78; H04N 5/917; H04N 5/84; H04N 5/89; H04J 3/00; H04B 7/216
USPC ......... 386/326, 211, 214, 217, 314, 324, 330, 386/332; 370/535, 536, 537, 542
See application file for complete search history.

(56) References Cited

U.S. PATENT DOCUMENTS

| | | | |
|---|---|---|---|
| 4,493,021 A * | 1/1985 | Agrawal et al. | ............... 709/236 |
| 5,633,683 A | 5/1997 | Rosengren et al. | |
| 5,663,962 A | 9/1997 | Caire et al. | |

(Continued)

OTHER PUBLICATIONS

Non-Final Office Action from U.S. Appl. No. 10/610,247, mailed Mar. 23, 2007.

(Continued)

*Primary Examiner* — Daquan Zhao
(74) *Attorney, Agent, or Firm* — Foley & Lardner LLP; Christopher J. McKenna; Paul M. H. Pua

(57) ABSTRACT

A system, method, and apparatus for playback of multiple video elementary streams is presented herein. A host processor modifies the video elementary streams to allow a transport demultiplexer to distinguish among the plurality of the video elementary streams.

20 Claims, 5 Drawing Sheets

(51) Int. Cl.
  *H04J 3/00* (2006.01)
  *G11B 20/10* (2006.01)

(56) References Cited

U.S. PATENT DOCUMENTS

| | | | |
|---|---|---|---|
| 6,477,185 | B1 | 11/2002 | Komi et al. |
| 6,538,656 | B1 * | 3/2003 | Cheung et al. ............... 345/519 |
| 6,925,097 | B2 | 8/2005 | Hagai et al. |
| 7,058,064 | B2 | 6/2006 | Nemirovsky et al. |
| 7,496,092 | B2 * | 2/2009 | Wilson ........................ 370/389 |
| 7,508,454 | B1 * | 3/2009 | Vantalon et al. ............. 348/571 |
| 7,533,402 | B2 | 5/2009 | Demas et al. |
| 2001/0009567 | A1 * | 7/2001 | Tsuboi .................... 375/240.25 |
| 2003/0091331 | A1 * | 5/2003 | Kim et al. ...................... 386/68 |
| 2003/0123556 | A1 | 7/2003 | Komori |
| 2003/0142752 | A1 | 7/2003 | Demas et al. |
| 2003/0165330 | A1 * | 9/2003 | Ju ................................. 386/98 |
| 2004/0190508 | A1 | 9/2004 | Houghton et al. |
| 2004/0240859 | A1 | 12/2004 | Karimoto et al. |

OTHER PUBLICATIONS

Non-Final Office Action from U.S. Appl. No. 10/610,247, mailed Jun. 24, 2008.

Non-Final Office Action from U.S. Appl. No. 10/610,247, mailed Oct. 14, 2009.

Non-Final Office Action from U.S. Appl. No. 10/610,247, mailed Apr. 27, 2010.

Non-Final Office Action from U.S. Appl. No. 10/610,247, mailed May 9, 2011.

Non-Final Office Action from U.S. Appl. No. 10/610,247, mailed May 17, 2012.

Non-Final Office Action from U.S. Appl. No. 10/610,247, mailed Apr. 22, 2013.

Final Office Action from U.S. Appl. No. 10/610,247, mailed Nov. 2, 2007.

Final Office Action from U.S. Appl. No. 10/610,247, mailed Sep. 30, 2010.

Final Office Action from U.S. Appl. No. 10/610,247, mailed Oct. 21, 2011.

Final Office Action from U.S. Appl. No. 10/610,247, mailed Aug. 31, 2012.

Final Office Action from U.S. Appl. No. 10/610,247, mailed Aug. 19, 2013.

Notice of Allowance from U.S. Appl. No. 10/610,247, mailed Jan. 6, 2014.

* cited by examiner

SYSTEM, METHOD, AND APPARATUS FOR PLAYING BACK A PLURALITY OF VIDEO ELEMENTARY STREAMS WITH ONE PLAYBACK CHANNEL

RELATED APPLICATIONS

This application is a continuation of, and claims benefit of and priority to, U.S. patent application Ser. No. 10/610,247, filed Jun. 30, 2003, the contents of which are incorporated herein by reference in their entirety for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The MPEG-2 standard represents video sequences by video elementary streams. Video elementary streams represent the raw output of a video encoder that compresses the video sequences and can be associated with other elementary streams, such as an audio elementary stream. The video elementary stream and associated other elementary streams after PES packetisation form what is known as a program. The PES streams so formed from Video and associated other streams are packetized into fixed length transport packets for transmission over a communication medium. The transport packets are transported as a stream (a transport stream) over a communication channel for decoding by a decoder.

The transport stream can include any number of programs multiplexed together for transport over a communication channel. Each program may use a different compression factor and bit rate that can change dynamically, even though the overall bit rate stays constant. The foregoing is known as statistical multiplexing. A decoder must be able to change from one program to the next and correctly select the appropriate video, audio, and other associated elementary streams.

The decoder demultiplexes the transport packets using a combination of parameters and tables. The transport packets include a header with packet identification parameter. The packet identification parameters correspond to entries in a program access table and Program Map Table that is present in the transport stream.

Once the video and audio elementary streams are demultiplexed and extracted from the transport stream, the video and audio elementary streams can be stored separately for future playback. The video and audio elementary streams are usually stored in a high capacity memory, such as a hard disc drive.

Some trick mode schemes now allow for simultaneous playback of multiple video elementary streams. For example, a feature known as Picture in Picture includes a primary video with another video displayed in a small section of the screen. The foregoing can be achieved in decoders with multiple playback channels. Additional playback channels are needed because after the video elementary streams are extracted from the transport stream, the video elementary streams are not readily distinguishable from one another.

However, addition of playback channels to decoder systems requires additional hardware and increases costs.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

Aspects of the present invention are directed to a system, method, and apparatus for playing back a plurality of video elementary streams with one playback channel is presented herein. A video decoder decodes and displays a plurality of video elementary streams stored in a hard disc drive. During playback of the plurality of video elementary streams, a host processor modifies the video elementary streams to allow remaining hardware and software to distinguish the various portions of one video elementary stream from another.

In one embodiment, the host processor breaks the video elementary stream into fixed length packets, wherein the pictures in the video elementary stream are aligned with the start of the fixed length packets. The host processor provides packets containing single pictures from each video elementary stream in a predetermined ordering scheme. The predetermined ordering scheme can include, for example, a round robin scheme. Responsive thereto, a transport demultiplexer places the data from each of the video elementary streams into a corresponding plurality of buffers.

In another embodiment, the Host processor breaks the video elementary stream into fixed length packets. It only prepends the fixed length packet that starts with a non-slice start code (that indicates the beginning of a picture (or Video Access Unit) with a header information. The header information tells the number of fixed length packets after which another picture (or Video Access Unit) starts. This method ensures that the host processor need not to do too much processing.

In another embodiment, the host processor breaks the video elementary stream into fixed length packets and prepends each fixed length packet with a header byte containing an identifier identifying the video elementary stream.

These and other advantages and novel features of the present invention, as well as illustrated embodiments thereof will be more fully understood from the following description and drawings.

DETAILED DESCRIPTION OF THE INVENTION

Figure 1:
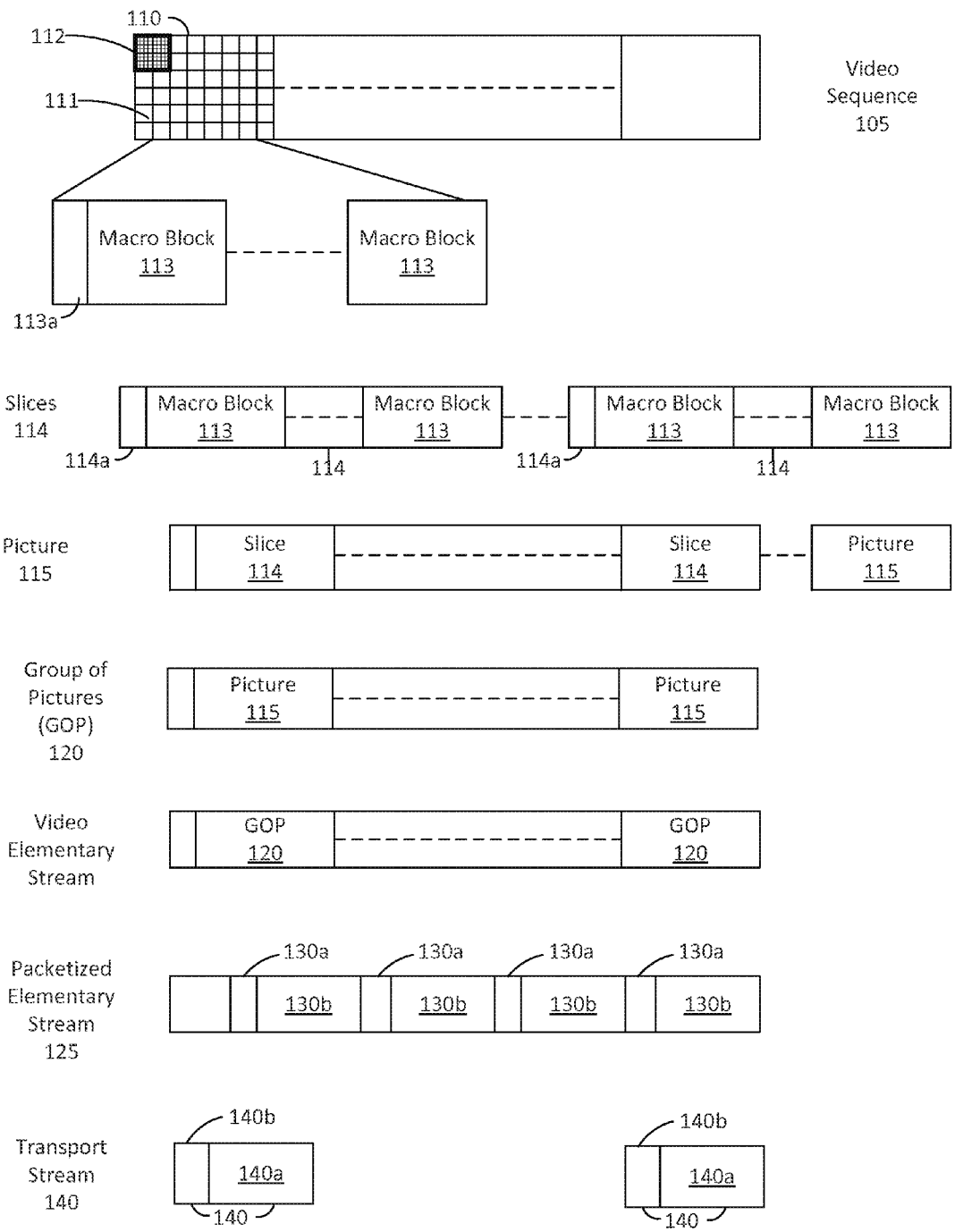
FIG. 1 is a block diagram of a transport stream carrying a video stream.

Referring now to FIG. 1, there is illustrated a block diagram of a transport stream carrying a video stream. A video sequence 105 comprises a series of frames 110. In a progressive scan, the frames 110 represent instantaneous images, while in an interlaced scan, the frames 110 comprise two fields each of which represent a portion of an image at adjacent times.

Each frame 110 comprises a two-dimensional grid of pixels 111. The two-dimensional grid of pixels 111 is divided into 8×8 segments 112. The MPEG standard takes advantage of spatial and temporal redundancy to compress the 8×8 segments. Each 8×8 segment is represented by a data structure known as a macroblock 113. The first macroblock in each row includes a row start code 113a.

The macroblocks 113 are grouped in what are known as slice groups. Each of the macroblocks 113 belonging to a slice group is stored in a data structure known as a slice 114. A slice 114 is commenced by a slice start code 114a. Each of the slices 114 associated with the frame are stored together in a data structure known as a picture 115. The picture 115 is a compressed representation of a frame and is also referred to as a video access unit (VAU). The pictures 115 are then grouped together as a group of pictures 120. Groups of pictures 120 are then stored, forming what is known as a video elementary stream 125.

The video elementary stream 125 is then broken into variable size segments that are packetized, forming packetized elementary stream (PES) packets 130. The PES 135 is then broken into fixed length segments. In MPEG-2, the fixed length is usually 188 bytes. Each fixed length segment forms a payload 140a portion of a transport packet 140. The transport packet 140 also includes at least four header bytes 140b with various parameters. The transport packets 140 are transported as a stream (a transport stream) over a communication channel for decoding by a decoder.

Any number of program streams can be multiplexed together for transport over a transmission over a communication channel. Each program may use a different compression factor and bit rate that can change dynamically even though the overall bit rate stays constant. The foregoing is known as statistical multiplexing. A decoder must be able to change from one program to the next and correctly select the appropriate audio and data channels.

Figure 2:
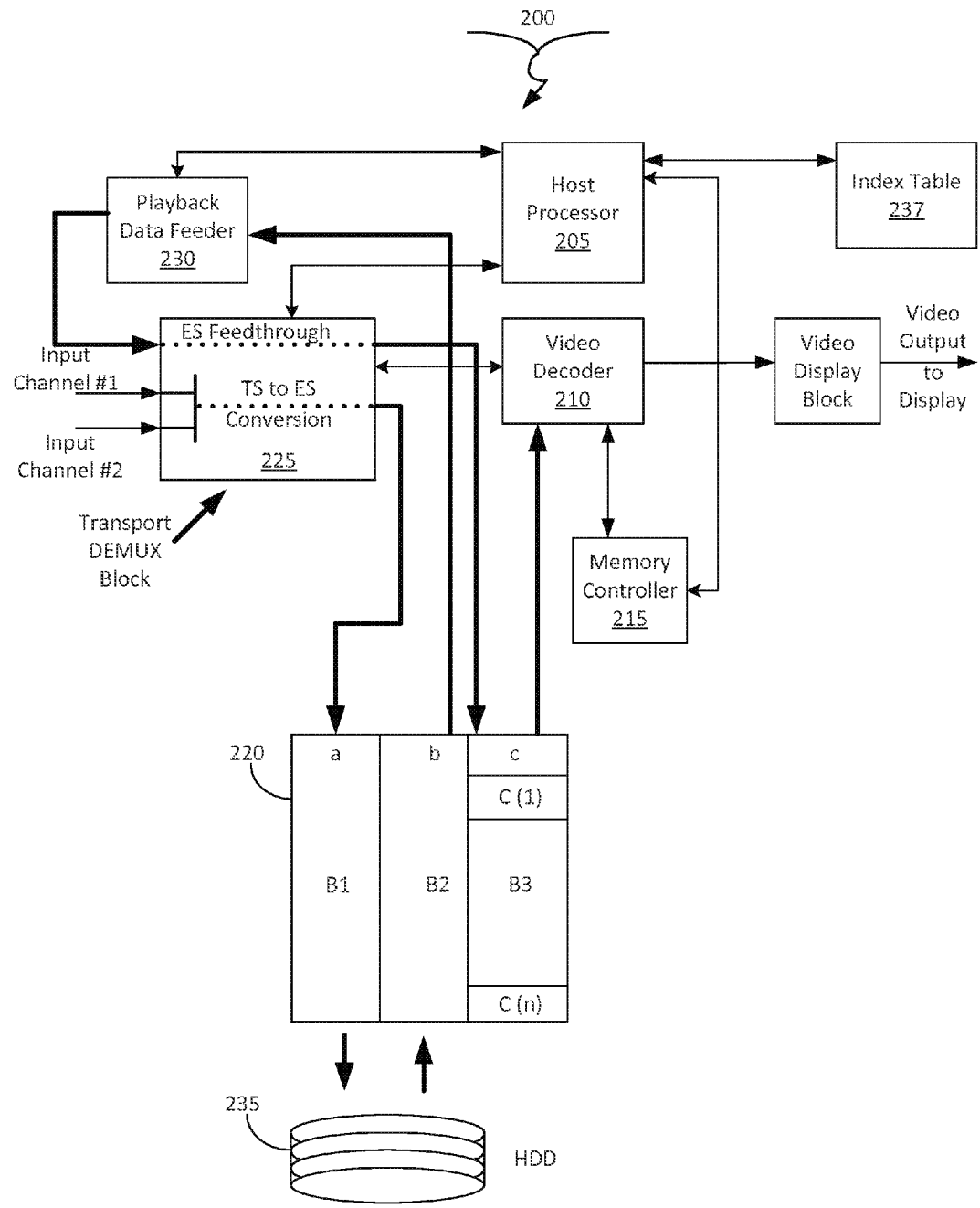
FIG. 2 is a block diagram of an exemplary decoder system in accordance with an embodiment of the present invention.

Referring now to FIG. 2, there is illustrated a block diagram of an exemplary decoder system 200 in accordance with an exemplary embodiment of the present invention. The decoder system 200 comprises a host processor 205, a video decoder 210, a memory controller 215, a video buffer 220, a transport demultiplexer 225, a playback data feeder 230, a hard disc drive 235, and an index table 237.

The transport demultiplexer 225 receives any number of input channels 240 carrying transport streams 140. The transport streams 140 are processed by the transport demultiplexer 225 to extract elementary streams 125 and stored in the buffer 220. The transport demultiplexer 225 is also used for video playback.

The buffer 220 comprises a pre-hard disc drive buffer 220a, a post hard disc drive buffer 220b, and a video buffer 220c. The extracted elementary streams 125 are stored in the pre-hard disc drive buffer. The host processor 205 transfers the extracted elementary streams 125 from the pre-hard disc drive and writes the extracted elementary streams 125 to the hard disc drive 235.

When the extracted elementary stream is written to the pre-hard disc drive buffer 220a, an entry is logged into the index table 237. The index table stores start codes, such as, for example, pictures start codes, stream header start codes, and GOP header start codes. Each start code stored in the index table 237 is associated with an address indicator storing the address in the pre-hard disc drive 220a where the start code is stored.

During playback, the host processor 205 puts the video elementary stream 125 stored in the hard disc drive 235 into the post hard disc drive buffer 220b. The playback data feeder 230 feeds the data from the post hard disc drive buffer 220b to the transport demultiplexer 225. The transport demultiplexer 225 places the played back stream into the video buffer 220c. The data in the video buffer 220c is decoded and displayed by the video decoder 210.

The video buffer 220c can be configured by the host processor 205 to comprise any number of other buffers 220c(1) . . . 220c(n), wherein each buffer stores a particular video elementary stream 125 for playback. When a plurality of video elementary streams 125 are played back, the demultiplexer stores each of the video elementary streams 125 played back in a particular one of the buffers 220c(1) . . . 220c(n).

Figure 3:
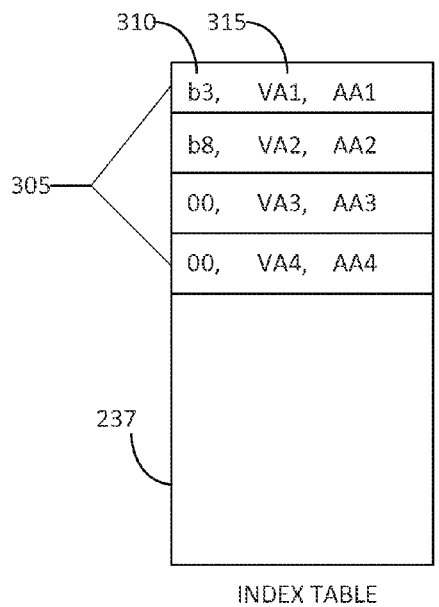
FIG. 3 is a block diagram of an exemplary index table in accordance with an embodiment of the present invention.

Referring now to FIG. 3, there is illustrated a block diagram of an exemplary index table 237 in accordance with an embodiment of the present invention. The index table 237 comprises any number of records 305. Each record 305 includes a start code 310 and an address identifier 315, wherein the address identifier 315 stores the address in the buffer 220 where the start code is stored. When the extracted elementary stream is written to the pre-hard disc drive buffer 220a, an entry is logged into the index table 237.

Although the decoder system 200 may only include a single playback data feeder 230, the decoder system 200 can play back a plurality of video elementary streams 125. During the playback of the plurality of video elementary streams 125, the host processor 205 modifies the video elementary streams 125 to allow the transport demultiplexer 205 to identify the different played back video elementary streams.

In one embodiment, the host processor 205 aligns the start of the first non-slice start code in the pictures of the video elementary streams with the start of virtual 188-byte packets. The host processor 205 then feeds single pictures from the different video elementary streams 125 in a predetermined ordering scheme. In another embodiment, the host processor 205 provides the elementary stream in the form of 188 byte packets, wherein the first byte of the packet identifies the video elementary stream.

Figure 4:
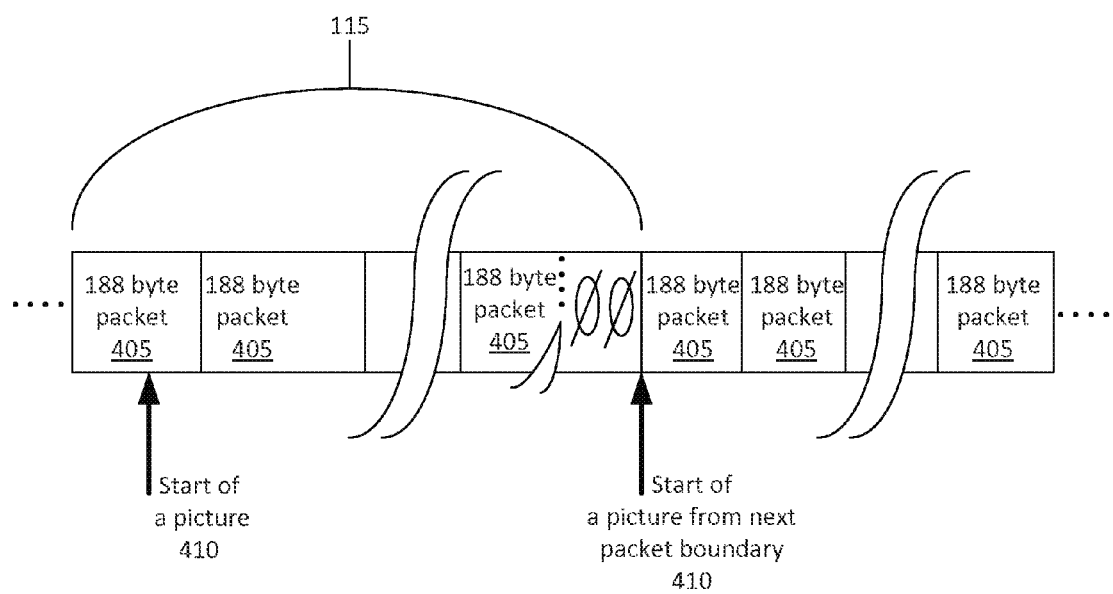
FIG. 4 is a block diagram describing modifications to the video elementary stream in accordance with an embodiment of the present invention.

Referring now to FIG. 4, there is illustrated a block diagram describing modifications to a video elementary stream in accordance with an embodiment of the present invention. The modifications can be used to provide single pictures from the different video elementary streams 125 in a predetermined ordering scheme. The video elementary stream 125 comprises pictures 115 representing video frames. The host processor 205 breaks the video elementary stream 125 into fixed length packets 405. For example, each fixed length packet 405 can comprise 188 bytes like transport packets.

In order for the host processor 205 to provide single pictures, the host processor 205 aligns the first non-slice start codes 410 to the start of the fixed length packets 405. Accordingly, as the host processor 205 breaks the video elementary streams 125 into fixed length packets, the host processor 205 examines the video elementary stream for the first non-slice start codes 410. When the host processor 205 finds a first non-slice start code 410, after a Slice start code, the host processor 205 breaks the packet 405 into two portions—the portion containing the data prior to the first non-slice start code 410 and the portion containing the first non-slice start code 410 and the following data. The portion containing the data prior to the first non-slice start code 410 is padded with 0's until the portion contains the fixed length of bytes.

The portion containing the first non-slice start code 410 commences a new fixed length packet 405. The fixed length packet 405 comprises the fixed length portion of the video elementary stream 125 beginning with the first non-slice start code.

The host processor 205 can provide a single picture in a series of fixed length packets 405 to the playback data feeder 235. When playing back multiple video elementary streams 125, the host processor 205 can provide packets comprising single pictures from each of the played back video elementary streams in a predetermined ordering scheme. The predetermined order scheme can comprise, for example, a round robin scheme.

Figure 5:
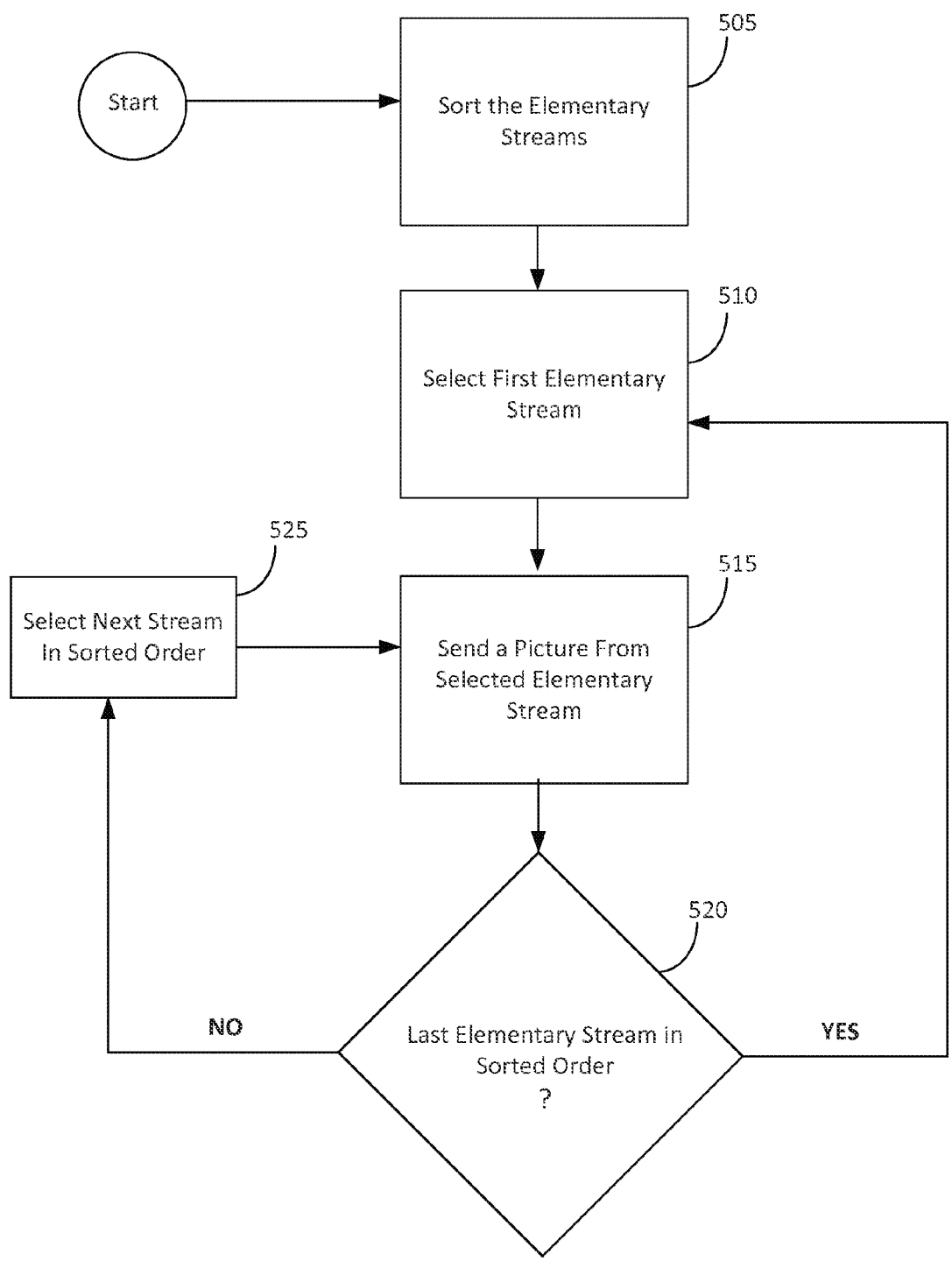
FIG. 5 is a flow diagram for displaying a plurality of video elementary stream in accordance with an embodiment of the present invention.

Referring now to FIG. 5, there is a flow diagram for displaying a plurality of video elementary streams 125 in accordance with an embodiment of the present invention. At 505, the host processor 205 sorts the video elementary streams 125 to be played back in an order. The order can be arbitrarily selected or based on a certain criteria. At 510, the host processor 205 selects the first video elementary stream 125 in the sorted order. At 515, the host processor 205 sends a picture from the selected video elementary stream 125 to the playback data feeder 235. The picture can be sent as a set of fixed length packets representing the picture as shown in FIG. 4.

After sending the picture from the selected video elementary stream 125 at 515, the host processor 205 determines at 520, whether the selected video elementary stream 125 is the last video elementary stream 125 in the sorted order. If the selected video elementary stream 125 is not the last video elementary stream 125 in the sorted order, the next video elementary stream 125 in the sorted order is selected at 525, and 515 is repeated. If the selected video elementary stream 125 is the last video elementary stream 125 in the sorted order, 515 (selecting the first video elementary stream 125 in the sorted order) is repeated.

As host processor 205 provides each picture to the playback data feeder 230, the transport demultiplexer 225 places the pictures of the video elementary streams in the particular one of the plurality of buffers 220c(1) . . . 220c(n) associated with the video elementary stream.

Figure 6:
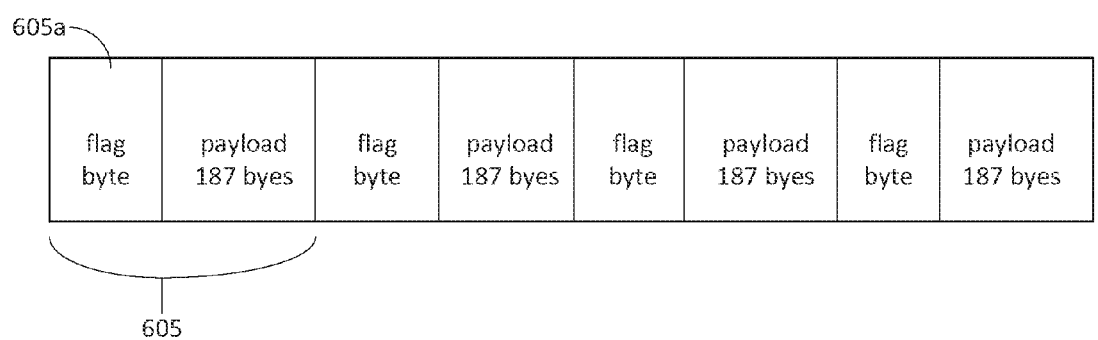
FIG. 6 is a block diagram describing modifications to the video elementary stream in accordance with another embodiment of the present invention.

Referring now to FIG. 6, there is illustrated a block diagram describing modifications to the video elementary stream 125 in accordance with another embodiment of the present invention. The video elementary stream 125 is broken into fixed length packets 605. The fixed length packets can comprise, for example 187 bytes. The host processor prepends each packet 605 with a header byte 605a. The header byte 605a stores an identifier that identifies the video elementary stream 125.

As the host processor 205 provides the modified video elementary stream 125 to the playback data feeder 230, the transport demultiplexer 225 examines the header bytes 605a of incoming packets 605. The transport demultiplexer 225 places the packets from the video elementary streams in the particular one of the plurality of buffers 220c(1) . . . 220c(n) associated with the video elementary stream.

The decoder system as described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein the flow diagram of FIG. 2 is implemented in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for playing back multiple video elementary streams from a transport stream, the system comprising:
    a memory configured to store the multiple video elementary streams from the transport stream;
    a demultiplexer configured to distinguish each of the multiple video elementary streams, wherein the memory is configured to provide the multiple video elementary streams to the demultiplexer during the playback of the multiple video elementary streams, and to store the multiple video elementary streams from the demultiplexer;
    a decoder configured to simultaneously decode the multiple video elementary streams, wherein the memory is configured to provide the multiple video elementary streams to the decoder;
    a controller configured to determine a plurality of addresses in the memory storing each particular one of the multiple video elementary streams; and
    a processor configured to fetch particular ones of the multiple video elementary streams from the memory, the processor further configured to include a plurality of identifiers in the multiple video elementary streams.

2. The system of claim 1, further configured to include the identifiers in a first byte of a plurality of transport packets.

3. The system of claim 1, wherein the processor is further configured to provide a first picture from a first one of the multiple video elementary streams, the processor further configured to provide a second picture from a second one of the multiple video elementary streams in response to providing the first picture.

4. The system of claim 3, wherein the processor is further configured to align a plurality of start codes with a transport packet header.

5. The system of claim 1, further comprising:
    a start code table configured to associate a start code in each of the multiple video elementary streams with a corresponding memory location.

6. The system of claim 1, wherein the demultiplexer is further configured to obtain at least one transport stream and to extract the multiple video elementary streams from the at least one transport stream, wherein packets of a first of the video elementary streams are identified by a first of the plurality of identifiers and packets of a second of the video elementary streams are identified by a second of the plurality of identifiers.

7. The system of claim 6, wherein the demultiplexer is further configured to provide the multiple video elementary streams to the memory prior to the multiple video elementary streams being stored in the memory.

8. The system of claim 1, wherein the memory comprises a plurality of buffers, wherein each of the plurality of buffers is configured to store a respective one of the multiple video elementary streams.

9. The system of claim 1, further comprising a playback data feeder configured to provide the multiple video elementary streams from the memory to the demultiplexer.

10. The method of claim 1, wherein the memory comprises at least one buffer, and wherein the memory is configured to store the multiple video elementary streams from the demultiplexer to the at least one buffer by storing each of the video elementary streams in a respective buffer portion of the at least one buffer.

11. The method of claim 1, wherein the memory comprises a pre hard disk portion, a post hard disk portion, and a video buffer.

12. A method for playing back multiple video elementary streams from a transport stream, the method comprising:
storing, by a memory, the multiple video elementary streams from the transport stream;
distinguishing, by a demultiplexer, each of the multiple video elementary streams, wherein the memory is configured to provide the multiple video elementary streams to the demultiplexer during the playback of the multiple video elementary streams, and to store the multiple video elementary streams from the demultiplexer;
simultaneously decoding, by a decoder, the multiple video elementary streams, wherein the memory is configured to provide the multiple video elementary streams to the decoder;
determining, by a controller, a plurality of addresses in the memory storing each particular one of the multiple video elementary streams; and
fetching, by a processor, particular ones of the multiple video elementary streams from the memory, the processor configured to include a plurality of identifiers in the multiple video elementary streams.

13. The method of claim 12, further comprising including the identifiers in a first byte of a plurality of transport packets.

14. The method of claim 12, further comprising providing, by the processor, a first picture from a first one of the multiple video elementary streams, and providing a second picture from a second one of the multiple video elementary streams in response to providing the first picture.

15. The method of claim 14, further comprising aligning, by the processor, a plurality of start codes with a transport packet header.

16. The method of claim 12, further comprising associating, via a start code table, a start code in each of the multiple video elementary streams with a corresponding memory location.

17. The method of claim 12, further comprising obtaining, by the demultiplexer, at least one transport stream, and extracting the multiple video elementary streams from the at least one transport stream, wherein packets of a first of the video elementary streams are identified by a first of the plurality of identifiers and packets of a second of the video elementary streams are identified by a second of the plurality of identifiers.

18. The method of claim 17, further comprising providing, by the demultiplexer, the multiple video elementary streams to the memory prior to the multiple video elementary streams being stored in the memory.

19. The method of claim 12, wherein the memory comprises a plurality of buffers, wherein each of the plurality of buffers is configured to store a respective one of the multiple video elementary streams.

20. The method of claim 12, further comprising providing, by a playback data feeder, the multiple video elementary streams from the memory to the demultiplexer.

\* \* \* \* \*